US005379027A

United States Patent [19]

Curtis

[11] Patent Number: 5,379,027

[45] Date of Patent: Jan. 3, 1995

[54] ORIENTED STRAND BOARD PRODUCT DETECTING APPARATUS USING PROXIMITY SENSOR

[75] Inventor: Leroy F. Curtis, Calais, Me.

[73] Assignee: Georgia-Pacific Corporation, Atlanta, Ga.

[21] Appl. No.: 46,167

[22] Filed: Apr. 15, 1993

[51] Int. Cl.[6] ........................ G08B 21/00; B65G 43/00

[52] U.S. Cl. ................................ 340/676; 198/502.3; 198/502.1

[58] Field of Search ................ 340/674, 676; 361/180; 250/223 R; 198/502.1, 502.3, 464.2, 810

[56] References Cited

U.S. PATENT DOCUMENTS

| | | | |
|---|---|---|---|
| 2,828,917 | 4/1958 | Wheeler et al. | 235/98 R |
| 3,165,726 | 1/1965 | Riley et al. | 340/674 |
| 3,339,125 | 8/1967 | Almy | 361/179 |
| 3,548,168 | 12/1970 | Beck | 377/25 |
| 3,573,784 | 4/1971 | Bachofer et al. | 340/568 |
| 3,577,955 | 5/1971 | Palmer | 198/502.1 X |
| 3,743,853 | 7/1973 | Dittman et al. | 307/116 |
| 3,822,009 | 7/1974 | Richards | 198/444 |
| 3,838,341 | 9/1974 | Gaines | 324/161 |
| 4,134,486 | 1/1979 | Grone | 198/464.3 |
| 4,419,384 | 12/1983 | Kane et al. | 427/560 |
| 4,713,831 | 12/1987 | Morisod | 340/676 X |
| 5,187,723 | 2/1993 | Mueller-Stuercken | 340/674 X |

*Primary Examiner*—James J. Groody
*Assistant Examiner*—John W. Miller
*Attorney, Agent, or Firm*—Banner, Birch, McKie and Beckett

[57] ABSTRACT

A proximity sensor adapted to sense the presence of metal is located in a processing system for producing pressed board product, such as oriented strand board (OSB), or the like, at a position to detect the presence or absence of product on a metal transfer screen when it is delivered to the unloader station. The sensor is carried by a floating support device that maintains the operating face of the sensor level. The operating face of the sensor is disposed a predetermined distance above the bottom of the support device whereby elevation of the support device and the mounted sensor by a passing board product displaces the sensor beyond its effective detection range to indicate the desired presence of product. Alternatively, when product is missing, the electric signal emitted by the sensor may be operatively connected to a sensible alarm or may be operative in the system control to automatically terminate system operation so that the detected malfunction can be corrected.

13 Claims, 4 Drawing Sheets

ORIENTED STRAND BOARD PRODUCT DETECTING APPARATUS USING PROXIMITY SENSOR

BACKGROUND OF THE INVENTION

The present invention relates generally to detecting devices. More particularly, the invention relates to a product detecting device useful in a system for the manufacture of processed board product, such as oriented strand board (OSB), or the like, to determine the existence of a system malfunction, whereby operation of the system can be terminated and the malfunction corrected.

A desirable alternative to natural solid wood, particularly for the properties of strength, durability, stability and finish is multi-layered oriented strand board, hereinafter referred to as OSB. Such material consists of several layers of thin wood strands, which are wood particles having a length greater than their width, arranged in cross-oriented layers. In practice, the strands are produced by slicing larger pieces of wood in a manner that the fibers in each strand are aligned substantially parallel to the strand length. The strands, to which a binder, such as urea or a resinous material, has been applied, are disposed on fine mesh metal screens in layers to form a relatively loose mat. The strands in each layer are positioned relative to each other with the long dimension of each in substantial parallel relation. Strands in adjacent layers, however, are disposed in substantial perpendicular or cross-oriented relation. The mat is compressed in a pressing device to the extent required to produce the desired board thickness. The resultant product is, thus, a compacted sheet or panel of board comprised of multi-layered, cross-oriented wood strands.

OSB board is typically produced on a production line in which the mats of layered wood strands mounted on screens are carried by appropriate transfer apparatus to a loading station at which the screens are placed each into a separate compartment of a multi-level cage from whence each can be transferred to a multi-platen press. In present-day production systems as many as fifteen or more mats may be compressed simultaneously in the press and, thereafter, delivered to an unloading station where the compacted product is removed from the respective transfer screens for transport to storage or to another operating station and the transfer screen recycled via a conveyor arrangement within the production system.

A problem frequently encountered in production systems of the described type is that a sheet, following compacting in the press, may not be completely delivered to the unloading station. This can result from a compacted sheet becoming lodged within the press whereupon the screen is moved into the unloading station leaving the sheet product behind in the press. Alternatively, the compacted sheet may become displaced on its transfer screen and only partly moved into the unloading station. In either case, the errant compacted sheet can result in damage to the equipment and thereby the cause of undesirable downtime of the system.

Accordingly, it is to the solution of such problems to which the present invention is directed.

SUMMARY OF THE INVENTION

Accordingly, the present invention provides for use in a processing system for producing pressed board product including a conveyor, a processing station and a conveyor unloading station, the combination including, sensing means operably disposed in the path of travel of said conveyor, and means for suspendedly mounting said sensing means, comprising a substantially fixed plate vertically spaced above said conveyor path of travel, a floating plate securing said sensing means with its operating face in detecting relation with respect to the surface of said conveyor, a pair of mutually spaced feeler feet depending from said floating plate, said feeler feet having a vertical dimension to place the bottom edge thereof a predetermined distance below the operating face of said sensor, and a plurality of support arms disposed at spaced locations about the periphery of said floating plate, said support arms being pivotally connected at their opposite ends to said floating plate and to said fixed plate, respectively, to maintain the operative disposition of said operating face of said sensing means during movement of said floating plate.

The feeler feet of the sensor mounting means are desirably formed of a shape that reduces the impact force occurring between the compacted sheet product and respective feeler feet when the former is moved into the latter. Desirably, the edges of the feet are arcuate in shape, preferably being formed as circular arcs.

The depending support arms that connect the floating plate for movement to the fixed plate are so arranged preferably on rectangular spacing, to insure, that the floating plate that mounts the sensor is maintained in horizontal, parallel relation with respect to the underlying surface being sensed.

The pivot connection between the support arms and the upper or stationary plate is advantageously formed as a pin and elongated slot connection in order to permit unobstructed retrograde movement of the mounting device across the surface of the sheet should such movement of the apparatus be required.

The sensing means utilized in the invention is a proximity sensor adapted to detect the presence of metal. Such form of sensor, when installed for operation in the described mounting apparatus, is effective to determine the existence of a malfunction in the system when, upon being actuated, it detects a presence of the metal screen thereby indicating the absence of the overlying sheet product. Consequently, the signal emitted by the sensor can be utilized to activate a warning device which may be visual or audible, or both. It can also, or alternatively, be operative in a system control circuit to automatically terminate operation of the system upon detecting an absence of product sheet.

Accordingly, it is a principle object of the present invention to provide an inexpensive, yet reliable detection organization for use in a processing system of the described type.

It is another object of the invention to eliminate the danger of equipment damage caused by a displaced sheet product in the concerned processing system.

Yet another object of the invention is to increase the operating efficiency of process board production systems of the described type by reducing the possibility and the extent of system downtime due to equipment damage.

For a better understanding of the invention, its operating advantages and the specific objectives obtained by its use, reference should be made to the accompanying drawings and description which relate to a preferred embodiment thereof.

DETAILED DESCRIPTION OF THE PREFERRED EMBODIMENTS

Figure 1:
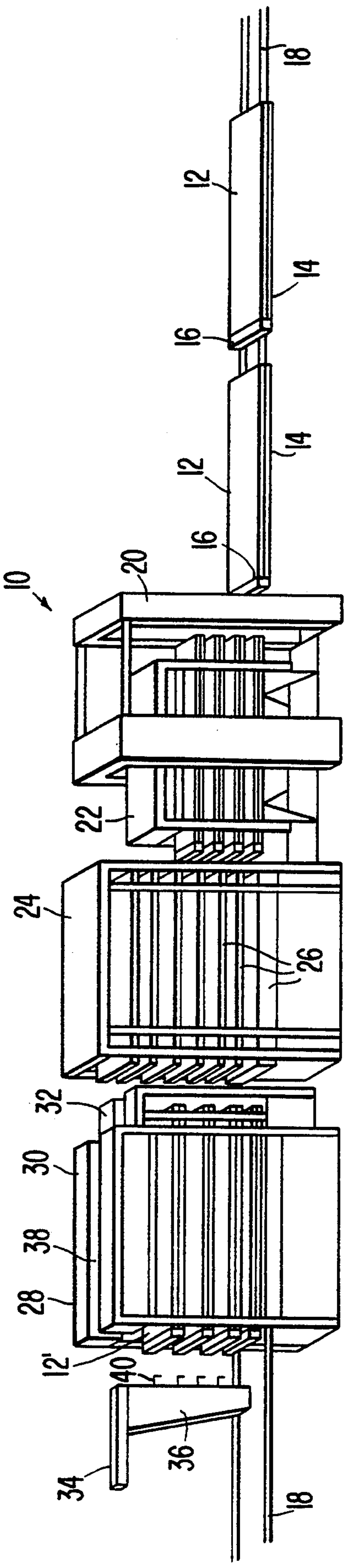
FIG. 1 is a perspective diagrammatic illustration of a portion of a production system utilized in the manufacture of oriented strand board for which the present invention has utility.
Figure 2:
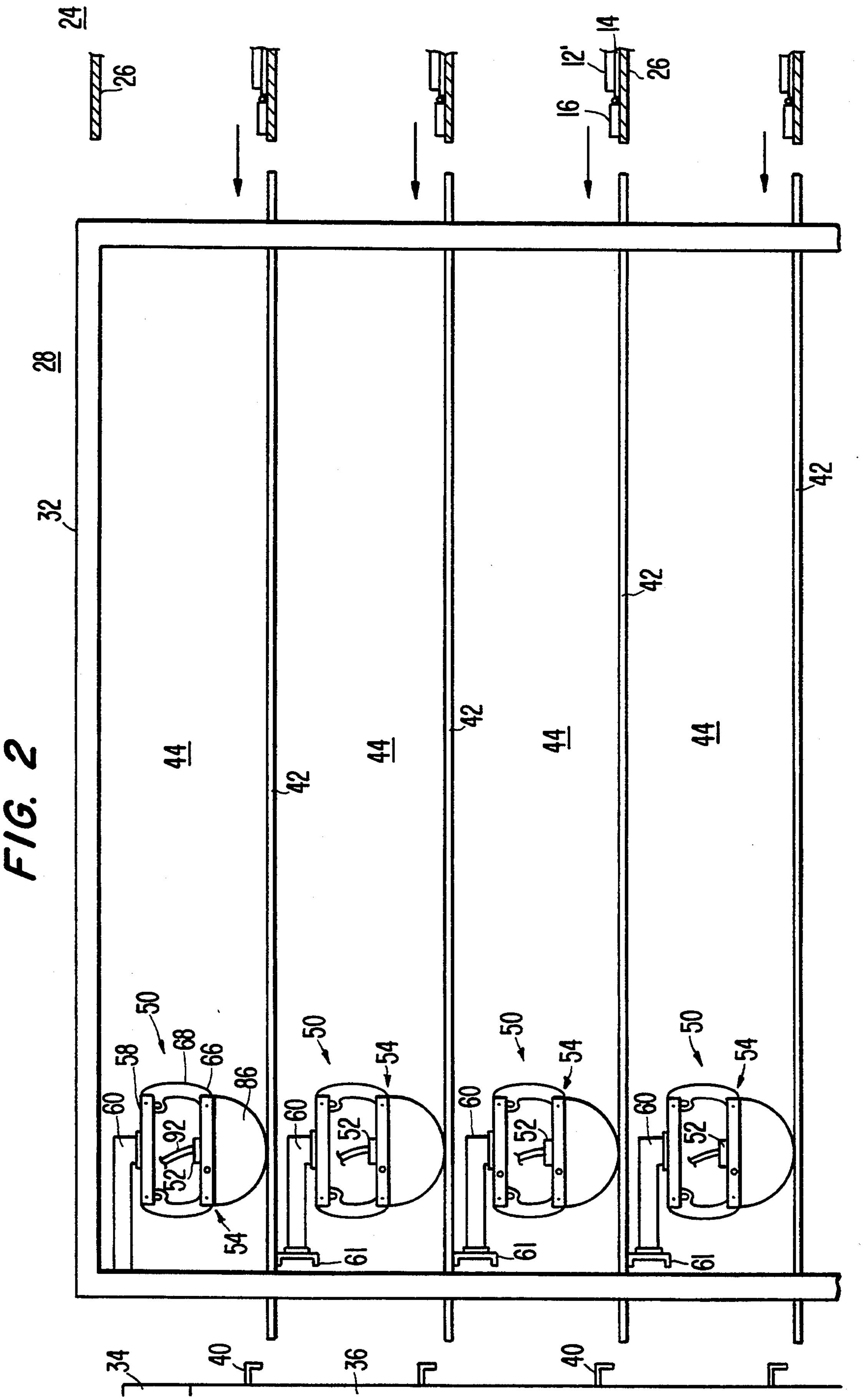
FIG. 2 is a vertical sectional view of the equipment illustrated in FIG. 1 illustrating the product sensing arrangement according to the present invention.

FIG. 1 illustrates the latter or tail end portion of a manufacturing system 10 typifying that employed in the production of OSB or other processed wood product. The system typically includes a number of preliminarily formed mats 12 containing loosely filled adhesive-beating wood particles deposited on fine mesh metal screens 14. The screens 14 each have a tow bar 16 which may be engaged by dogs (not shown) on parallel conveyor chains 18 for transporting the mat-laden screens 14 to a loader station 20. The loader station 20 includes a cage 22 that may be indexed in the vertical direction in order to receive a number of screens 14 and to arrange them in a vertically-spaced army for transfer into a press 24 between the respective platens 26 therein. In the press 24 the mats are pressed and heated to effect compression of the mat and setting and curing of the adhesive whereby a compacted board sheet or panel (indicated as 12') is formed.

Thereafter, the layers of compacted product are transferred from the press 24 to an unloader station 28 which includes a frame 30 within which an unloader cage 32 is adapted to move up and down. Transfer is effected by an unloading arm 34 comprising a body 36 that is imparted with reciprocating motion, as indicated by the arrow 37, between the downstream or discharge side of the press 24 and the downstream side of the unloading station 28. To accommodate movement of the unloader arm 34 the unloading station 28, including its frame 30 and the unloader cage 32 operable therein, contain a longitudinal slot 38 which is sized to permit passage of the unloader arm. The body 36 of the unloader arm 34 contains a plurality of vertically spaced, inverted hooks 40 which are disposed on predetermined spacing to enable each to grasp a shackle or clevis (not shown) on each of the tow bars 16 to withdraw the screens 14, together with the compacted board sheets or panels 12' thereon, from the press 24 and to transfer them to the unloader cage 32 onto sets of laterally spaced slide rails 42 that define vertically spaced compartments 44 for receiving the respective board-laden screens. After receiving the screens 14, the unloader cage 32 is adapted to be indexed downwardly whereupon the respective screens can be transferred from the compartments 44 by means of the conveyor chains 18 whose dogs (not shown) engage the tow bars to conduct the screens 14 to an area for unloading and stacking of the sheets or panels 12' or for their further processing.

In accordance with the present invention, each compartment 44, at the distal end thereof, contains an electrically operated sensing device 50 that is effective to detect the presence or absence of a compacted board sheet 12' and that can, upon detecting the absence of a sheet from the screen 14 which has been delivered to the compartment, either activate a sensible alarm of a visual or audible nature and/or automatically terminate operation of the system. Regardless for whether system operation is terminated automatically or in response to activation of an alarm, the missing sheet 12' can be cleared either from the press 24 or from a region intermediate the press and the unloader station whereby damage to the system can be prevented.

The sensing device 50 utilized in the practice of the invention is a proximity switch which has the capability of detecting metal over a limited range. Advantageously, the sensing device may be an electrically operated inductive proximity switch 52 which is particularly adapted to detect the presence of metal within a predetermined unshielded operational range. In practice, a Type 1CE Inductive Proximity Switch marketed by Efector, Inc., subsidiary of IFM Electronic, is suitable for the desired purpose.

According to the invention the proximity switch 52 is carded in a mounting apparatus, indicated generally at 54, which is particularly arranged to ensure that the detecting face 56 of the proximity switch maintains a horizontal attitude regardless of movement imparted to the mounting apparatus. Thus, the mounting apparatus 54 comprises a upper plate 58 that is fixedly secured with respect to the unloader rails 42 by means of an elongated bracket 60 which connects at one end via a structural member 61, such as a channel or angle member or the like, to the overlying rails 42. At the other end, the bracket contains an attachment plate arranged to engage the upper surface of the upper plate 58 and to connect it via through-bolts 62 which extend through bolt holes 64 provided in the respective plates.

Figure 3:
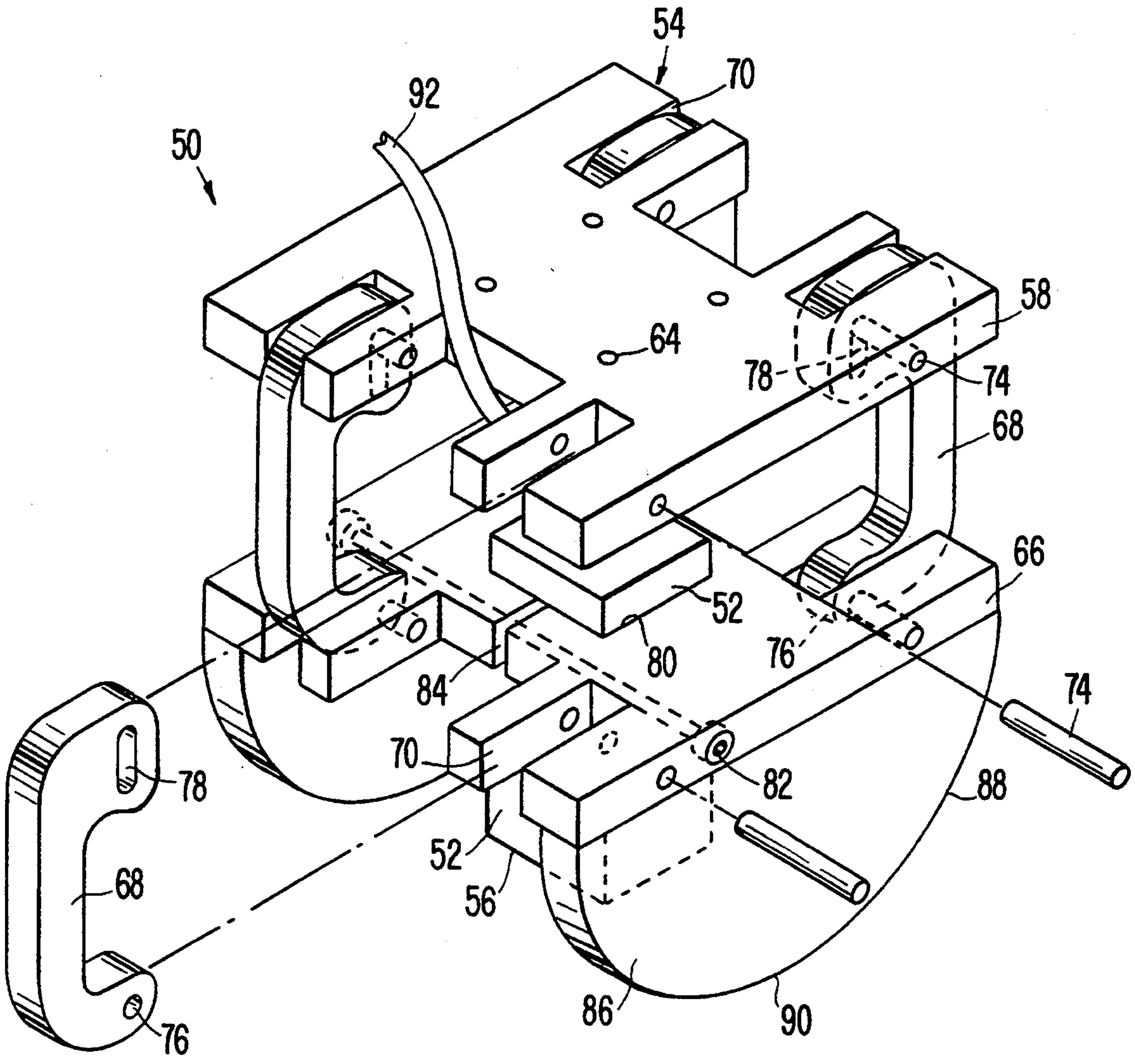
FIG. 3 is an exploded perspective illustration of the product sensing arrangement shown in FIG. 2.
Figure 4:
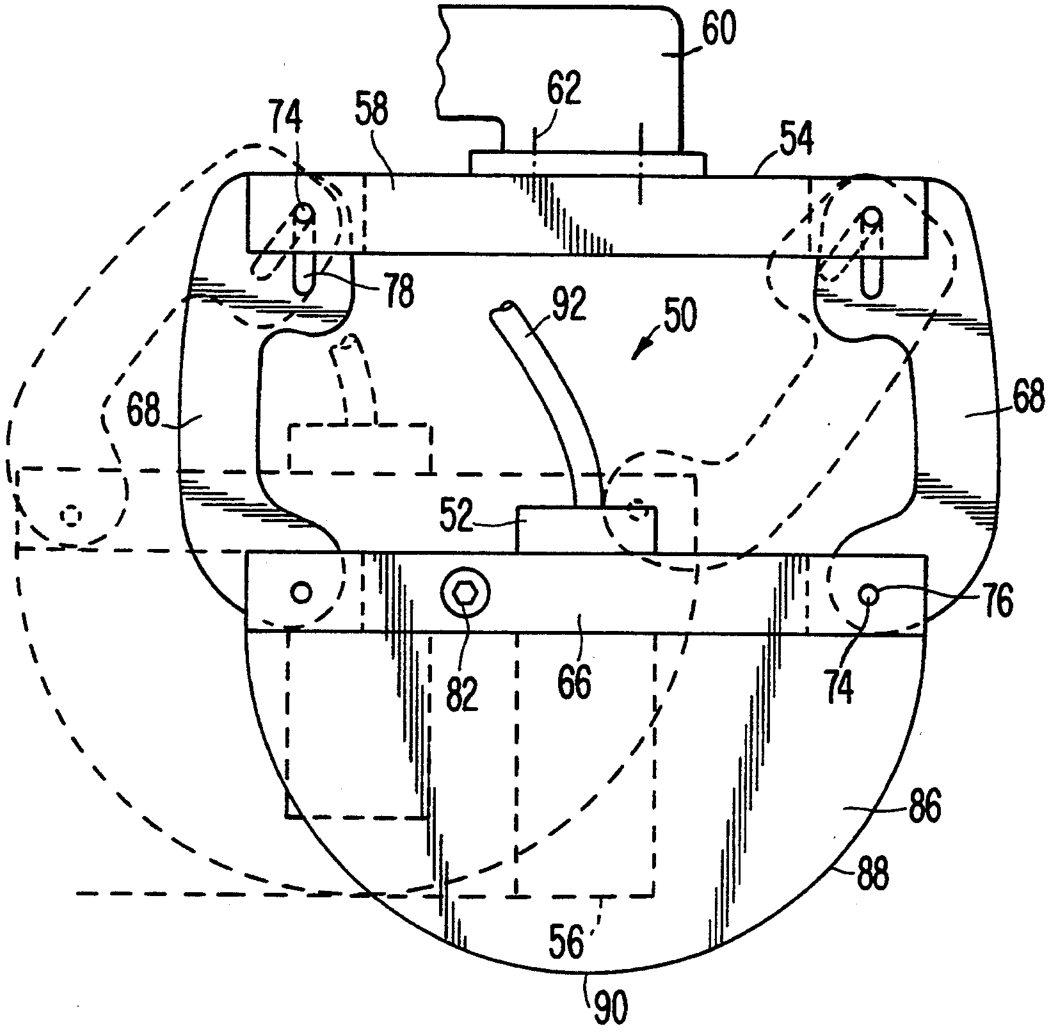
FIG. 4 is an elevational view of the sensing arrangement of FIG. 2 illustrating the mounting apparatus both in a normal, suspended position and its displaced position.

Suspended from the upper plate 58 in spaced, parallel relation thereto, is a floating plate 66 which is adapted to mount the switch 52. The floating plate 66 is suspended by means of rectangularly positioned support arms 68 that connect the two plates at about their respective comers by means of pivotal connections. As shown best in FIG. 3, each support arm 68 comprises a bar member that is provided at opposite ends with a transverse offset to give each arm a substantial C-shape. The arms are adapted to be received in slots 70 and 72 provided in the upper plate 58 and floating plate 66, respectively, and connected therein by means of pivot pins 74. The pivot pins 74 effecting connection between the floating plate 66 and the lower ends of the respective support arms 68 extend through simple clearance holes 76. The pins 74, which effect connection of the upper ends of the support arms 68 with the fixed upper plate 58 however, extend through vertically elongated slots 78, the purpose of which is explained hereinafter.

The floating plate 66 is provided with a central opening 80 that is shaped to conform to the cross-sectional shape of the proximity switch 52. The switch is adapted to be frictionally; retained in the opening 80 by means of an elongated bolt 82 that extends through a compression slot 84 for applying compressive forces about the sides of the switch to hold it within the opening.

A pair of feeler feet 86 extending substantially parallel with the mils 42 depend from oppositely spaced sides of the floating plate 66. The feeler feet 86 each have a curvilinear peripheral edge 88 which is preferably formed as an arc of a circle. The feet 86 are dimensioned and arranged such that the detecting face 56 of the proximity switch 52 when secured in the plate opening 80 is provided with a predetermined disposition with respect to the lowermost or contacting points 90 on the edges 88, that depends upon the sensitivity or operating range of the proximity switch employed. Thus, for systems for producing compacted board sheets or panels 12' having a thickness dimension not substantially less than about one-quarter inch a proximity switch 52 having a maximum scanning range of about one-half inch is secured in the opening 80 of floating plate 66 with the detecting face 56 of the switch disposed about three-eights inch from the contacting points 90 on the feeler feet 86. It will be appreciated that, with the proximity switch 52 having an effective operating range of about one-half inch for detecting metal, when the feeler feet 86 engage a compacted board 12' having a thickness of one-quarter inch or greater, the detecting face 56 of the proximity switch 52 is raised to a level which places it beyond the one-half inch operating range of the switch whereby no detection signal can be emitted.

On the other hand, however, were a sheet or panel 12' to be missing from the sensed region of the screen 14 beneath the detection face 56 of the switch 52, the feeler feet 86 would engage the surface of the metal screen 14 whereupon the detection face 56 of the switch 52 is disposed only the three-eighths inch distance above the screen surface. This dimension, being within the one-half inch operating range of the switch, will effect the emission of a detection signal indicating the absence of product from the screen and, deductively, that a malfunction exists in the concerned portion of the system. Consequently, the invention contemplates, by means of the wires 92, transmission of the detection signal either to an audible or visual sensible alarm, to alert the operator to the existence of a deduced problem in the system warranting termination of system operation for examination and repair. Alternatively, or in addition to the actuation of a sensible alarm, the detection signal can be transmitted via appropriate wiring to a signal-responsive device operable, when actuated, to terminate system operation so that the detected problem can be rectified.

It will be appreciated that for effective operation of the described sensing means, accommodation must be made for the tow bar and/or the exposed leading end of the transfer screen as they are drawn past the detection face of the proximity switch. Thus, circuit means are provided, as for example appropriately positioned limit switches or the like, to insure that the proximity switch is actuated only when the unloader arm has drawn the set of tow bars to their fully extended position within the respective unloader cage compartments. In this way, the creation of spurious signals caused by the sensing of the concerned equipment elements formed of metal material is avoided.

It will be further appreciated that the described detection arrangement for the disclosed pressed board processing system is rendered functional due to the ability to maintain the detection face of the proximity switch, at all times, parallel with respect to the sensed surface, be it the upper surface of the compacted board product or the surface of the metal transport screen. This is accomplished by the imposition of rectangularly arranged support arms pivotally connected between the fixed upper plate and the floating plate of the mounting device. Also, by providing the pivot connections between the support arms and one of the plates, here shown as the fixed upper plate, any jamming of the mounting device, when the floating plate has been displaced into an elevated position atop the board sheet, is prevented since the floating head and the attached arms can be simply raised to free the feeler feet from a wedged condition.

Also, serving to enhance the free movement of the mounting device with respect to the tow bar and board is the curvilinear or arcuate shape of the feeler feet which enables smooth, unencumbered relative sliding movement between those elements and the board-laden screen when it is drawn into contact with the feet.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. For use in a processing system for producing pressed board product including a conveyor, a processing station and a conveyor unloading station, the combination including:
   - sensing means operably disposed in a position overlying the path of travel of said conveyor; and
   - means for suspendedly mounting said sensing means comprising:
     - a substantially fixed plate vertically spaced above said conveyor path of travel,
     - a floating plate securing said sensing means with its operating face in detecting relation with respect to the surface of said conveyor,
     - a pair of mutually spaced feeler feet depending from said floating plate, said feeler feet having a vertical dimension to place the bottom edge thereof a predetermined distance below the operating face of said sensor, and
     - a plurality of support arms disposed at spaced locations about the periphery of said floating plate, said support arms being pivotally connected at their opposite ends to said floating plate and to said fixed plate, respectively.

2. The combination according to claim 1 in which said feeler feet are formed as rockers having a direction of movement substantially coincident with the direction of movement of said conveyor.

3. The combination according to claim 2 in which said rockers have an arcuate peripheral edge.

4. The combination according to claim 3 in which said rockers have a peripheral edge formed on an arc of a circle.

5. The combination according to claim 1 in which said support arms are on substantial rectangular spacing between said fixed plate and said floating plate, and said arms being pivotally connected at their opposite ends to said fixed plate and said floating plate to effect substantially coincident movement of said arms whereby said floating plate is maintained in a substantially horizontal attitude.

6. The combination according to claim 5 in which said arms are connected to said floating plate by a pin and clearance hole connection and to said fixed plate by a connection of a pin in a vertically elongated slot.

7. The combination according to claim 1 in which said conveyor is a metal screen on which said board product is adapted to lie and in which said sensor is a proximity sensor for indicating the presence of metal.

8. The combination according to claim 7 in which said proximity sensor has a detection range greater than the distance between the operating face of the sensor and the bottom edge of said feeler feet but less than the cumulative value of said distance and the thickness of the product.

9. The combination according to claim 8 in which said proximity sensor includes detector means adapted to emit an electric signal in response to a sensed absence of product on said conveyor.

10. The combination according to claim 9 in which said electric signal actuates a sensible alarm.

11. The combination according to claim 9 in which said electric signal is operative in a control circuit for said processing system to automatically terminate operation of said processing system.

12. The combination according to claim 7 in which said sensing means is disposed in said unloading station.

13. The combination according to claim 12 in which said unloading station comprises a plurality of compartments, each for receiving one of said product-laden metal screens, and said sensing means is disposed at the distal end of each said compartment.

* * * * *